United States Patent Office 3,267,719
Patented August 23, 1966

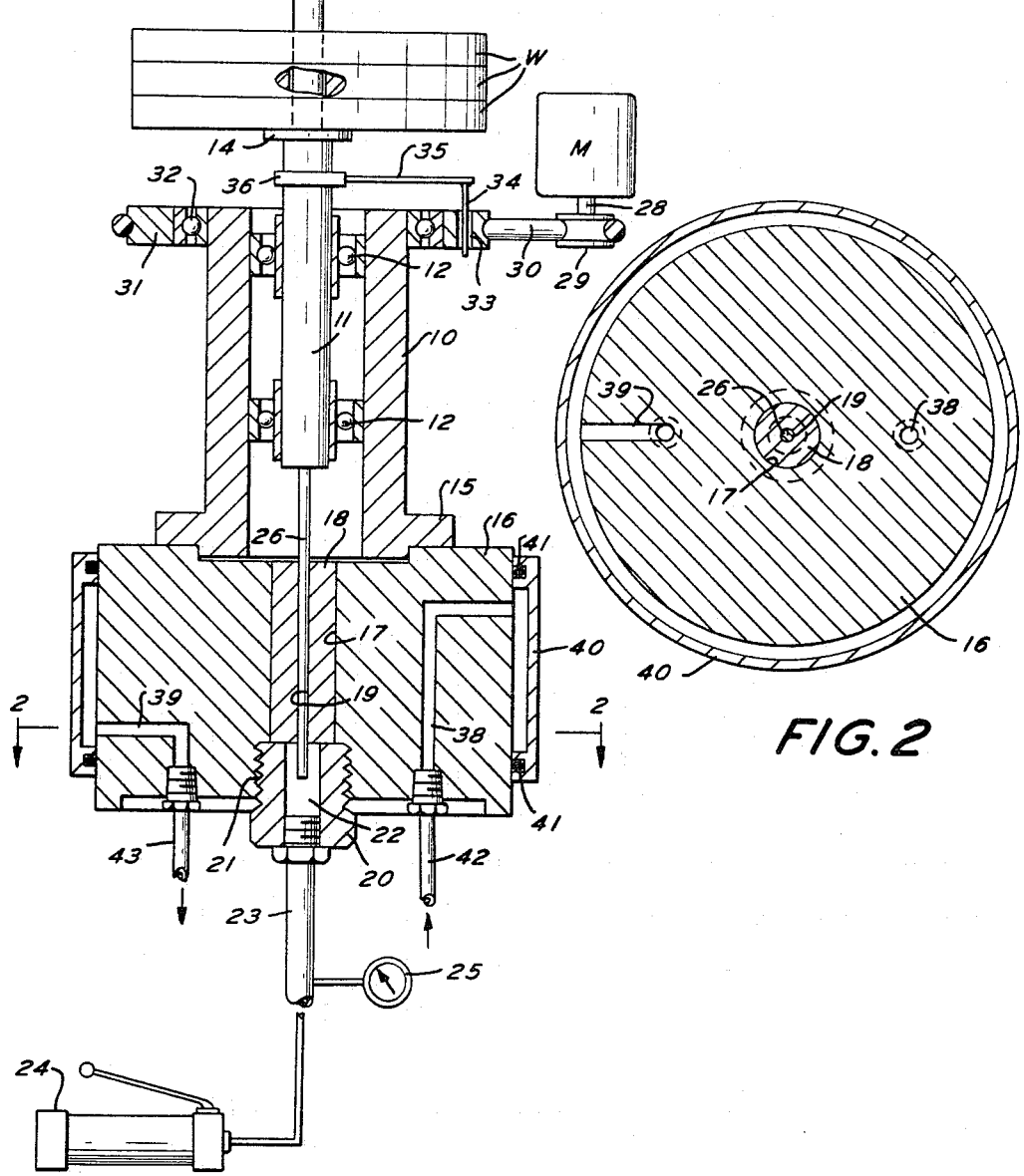

3,267,719
CONTROLLED CLEARANCE PISTON GAGE
Fred P. A. Wagner, Upper Moreland Township, Montgomery County, and John C. Bowen, Huntingdon Valley, Pa., assignors to Astra Corporation, Hatboro, Pa., a corporation of Pennsylvania
Filed Oct. 8, 1964, Ser. No. 402,417
10 Claims. (Cl. 73—4)

This invention relates to a controlled clearance piston gage such as is utilized for dead weight testing but which has clearance control means which is useful for other purposes.

It has heretofore been proposed to provide a controllable sliding fit and thereby the leakage between telescoped elements. One such device is shown in Patent No. 2,796,229 in which fluid under high pressure is employed for loading. Difficulties and lack of accuracy occur however because of the failure to provide any temperature compensation so that changes in the temperature of the fluid and/or the ambient temperature affect the result.

It is the principal object of the present invention to provide a cylinder and piston assembly having controlled clearance therebetween, this being obtained by employing a controlled temperature source and concentric elements having different temperature coefficients of expansion.

It is a further object of the present invention to provide a cylinder and piston having a controlled clearance therebetween and with a controlled temperature source effective directly on one of the clearance determining elements.

It is a further object of the present invention to provide differential temperature responsive elements for a clearance to be controlled.

It is a further object of the present invention to provide a controlled clearance piston gage having in one embodiment a controlled temperature source, differential temperature responsive elements in contact and on one of which the source is directly effective and on the other of which the source is indirectly effective, the other element having a relatively movable device clearance of which is determined by the action of the source.

It is a further object of the present invention to provide an improved dead weight tester.

Other objects and advantageous features of the invention will be apparent from the description and claims.

The nature and characteristic features of the invention will be more readily understood from the following description taken in connection with the accompanying drawings forming part thereof, in which:

FIGURE 1 is a vertical central sectional view of a gage having provisions for clearance control in accordance with the invention, parts being shown diagrammatically; and FIG. 2 is a horizontal sectional view taken approximately on the line 2—2 of FIG. 1.

It should, of course, be understood that the description and drawings herein are illustrative merely, and that various modifications and changes can be made in the structure disclosed without departing from the spirit of the invention.

Referring now more particularly to the drawings, in which a preferred embodiment of the invention is illustrated, a hollow cylindrical housing 10 is shown within which a piston 11 is mounted in spaced anti-friction bearings 12. The piston 11, at its upper end, has a shoulder 14 for supporting the weights W to be applied where the invention is utilized in a dead weight tester.

The housing 10 has a flange 15 carried on an outer sleeve or ring 16 within a central opening 17. The central opening 17 has an inner sleeve or core element 18 therein with a central bore 19.

The central opening 17, at its lower end has a cylinder plug 20 engaging the core element, and secured in the ring 16 in any desired manner such as in threaded engagement at 21. The plug 20 has a hollow interior chamber or space 22 with which a fluid pressure supply pipe 23 is in communication. The pipe 23 is connected to any suitable controlled source 24 of fluid pressure with or without a built in amplifier and a pressure indicating gage 25 can be connected to the pipe 23.

The piston 11 has an extension portion 26 extending through the bore 19 and into the chamber 22. The clearance between the piston portion 26 and bore 19 is controlled, as hereinafter explained, and the lower end of the piston portion 26 is exposed to a controlled pressure in the chamber 22.

In order to free the piston 11 and its extension portion 26 of the effects of static friction, a motor M can be provided with a drive shaft 28 carrying a pulley 29 which is connected by a belt 30 to a pulley 31. The pulley 31 is carried on a bearing 32 mounted on the housing 10. The pulley 31 has a vertical hole 33 for the reception of drive pin 34 loosely therein. The drive pin 34 is carried on the outer end of a clamp arm 35, the arm 35 being secured to the piston 11 for rotating the same by a clamp 36.

The temperature of the ring 16 and core 18 is determined by the application of heat thereto in any desired manner. By way of illustration heating by liquid is shown.

Within the interior of the ring 16 fluid passageways 38 and 39 can be provided for supply to and discharge from an exteriorly disposed jacket 40 having packing rings 41 for preventing fluid leakage at these locations. Supply and exhaust pipes 42 and 43 are connected to the passageways 38 and 39 and to a source of controlled temperature fluid for circulation. For operation with low pressures in the chamber 22, up to pressures of the order of 50,000 p.s.i. piston portion 26 is of a material having a relatively low thermal coefficient of expansion and a relatively high modulus of elasticity such as tungsten carbide or tungsten, and for such low pressures in the chamber 22 the outer sleeve or ring 16 and the inner sleeve or core element 18 can be integral and both of the same material and which has a higher thermal coefficient of thermal expansion, such as steel, stainless steel, copper, or aluminum.

If high pressures are employed in the chamber 22, ranging up to 200,000 p.s.i. or higher, the piston portion 26 can be of a material having a low thermal coefficient of expansion, and a relatively high modulus of elasticity, such as tungsten carbide or tungsten, the outer sleeve or ring 16 is made of a material having a relatively high thermal coefficient of expansion and a relatively high modulus of elasticity within the range of temperature employed and the inner sleeve or core element 18 is made of a material having a relatively lower thermal coefficient of expansion within that range.

Suitable pairings of materials for the outer sleeve or ring 16 and the inner sleeve or core element 18 include a core element 18 of iron with a shell 16 of copper, aluminum, or stainless steel. Another suitable combination is a tungsten carbide or tungsten core element 18 with a shell 16 of iron, steel, stainless steel, copper or aluminum.

The mode of operation will now be pointed out.

Weights W of the desired magnitude are carried by the piston 11 and the piston 11, to eliminate static friction, is rotated by the rotation of the motor M. Vertical movement of the piston 11 is permitted by the loose connection between the pin 34 and the hole 33. If now a fluid pressure is applied from the source 24 and through the pipe 25 against the lower end of the piston portion 26, the operator can control the clearance between the piston portion 26 and the bore 19 so that the piston 11 can move freely in response to variations in the weights W and loading pressure in the chamber 22 but without excessive loss of fluid or pressure thereof from the chamber 22.

The control of the clearance is effected by determining the temperature at which the ring 16 and core 18 are maintained by the fluid in the jacket 40. Changing the temperature changes the compressive force applied by the ring 16 and the core 18 which in turn determines the size of the bore 19 and consequently the clearance between the piston portion 26 and the bore 19.

We claim:

1. An apparatus for controlling the clerance between a first member having a bore and a fluid chamber and a second member extending along said bore and having a portion for application thereagainst of the fluid in the chamber, the improvement comprising at least one of said members being of a material having a predetermined thermal coefficient of expansion, and means for controlling the temperature of said first member to determine the size of the bore thereof in its relation to the second member.

2. Apparatus as defined in claim 1 in which said first member includes inner and outer sleeves in engagement, the bore being located in said inner sleeve, said sleeves being of materials having different thermal coefficient of expansion.

3. Apparatus as defined in claim 2 in which said outer sleeve is of a material having a higher thermal coefficient of expansion than said inner sleeve.

4. Apparatus as defined in claim 1 in which said first member and said second member have portions with different thermal cofficients of expansion.

5. In combination, a cylinder member having a fluid chamber and a bore communicating with said chamber, a piston member extending through said bore and into said chamber, means for applying a fluid pressure in said chamber and against said piston, said cylinder member having a sleeve portion within which said bore is disposed, said sleeve being of material having selected thermal expansion characteristics, and means for controlling the clearance between said sleeve and said piston including members for controlling the temperature of said sleeve portion.

6. Apparatus as defined in claim 5 in which a second sleeve portion is provided in surrounding relation to said first mentioned sleeve portion, said sleeve portions having different thermal cofficients of expansion.

7. Apparatus as defined in claim 6 in which said second sleeve portion is of a material having a higher thermal cofficient of expansion.

8. Dead weight testing apparatus comprising a cylinder member having a fluid chamber and a bore communicating with said chamber, a piston member extending through said bore and into said chamber, means for applying selected forces on said piston member, static friction eliminating means connected to said piston member, means for applying a fluid pressure in said chamber against said piston member, measuring means responsive to the applied fluid pressure, and means for controlling the clearance in said bore between said cylinder member and said piston member including members for controlling the temperature of said cylinder member.

9. Dead weight testing apparatus as defined in claim 8 in which said cylinder member has inner and outer sleeves in engagement and of materials having different thermal coefficients of expansion, and said bore is disposed in the inner of said sleeves.

10. Dead weigth testing apparatus as defined in claim 9 in which said last members include a fluid carrying jacket on said outer sleeve.

References Cited by the Examiner

Johnson et al.: AMSE Transactions, vol. 75 (Number 3) (1953), p. 301–310. Copy in Scientific Library.

LOUIS R. PRINCE, *Primary Examiner*.

UNITED STATES PATENT OFFICE
CERTIFICATE OF CORRECTION

Patent No. 3,267,719                                August 23, 1966

Fred P. A. Wagner et al.

It is hereby certified that error appears in the above numbered patent requiring correction and that the said Letters Patent should read as corrected below.

Column 2, line 1, for "within" read -- with --; column 3, line 19, for "clerance" read -- clearance --; column 4, line 33, for "weigth" read -- weight --.

Signed and sealed this 1st day of August 1967.

(SEAL)
Attest:

Edward M. Fletcher, Jr.                                EDWARD J. BRENNER
Attesting Officer                                        Commissioner of Patents